US007144066B2

(12) United States Patent
Omori et al.

(10) Patent No.: US 7,144,066 B2
(45) Date of Patent: Dec. 5, 2006

(54) POWER TAILGATE APPARATUS

(75) Inventors: Toshihisa Omori, Utsunomiya (JP); Yoshitomo Ihashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/899,624

(22) Filed: Jul. 27, 2004

(65) Prior Publication Data

US 2005/0023855 A1 Feb. 3, 2005

(30) Foreign Application Priority Data

Jul. 30, 2003 (JP) ............................ 2003-282671
Aug. 6, 2003 (JP) ............................ 2003-288081

(51) Int. Cl.
*B60J 5/02* (2006.01)

(52) U.S. Cl. ................ 296/146.8; 296/56; 296/146.11; 49/340; 49/341; 49/342; 74/89.17

(58) Field of Classification Search .................. 296/56, 296/146.4, 146.8, 146.11; 49/340, 341, 342, 49/347; 74/89.17
See application file for complete search history.

(56) References Cited

U.S. PATENT DOCUMENTS 6,142,551 A * 11/2000 Ciavaglia et al. ............. 296/56
6,382,706 B1 * 5/2002 Yuge et al. .............. 296/146.4
6,513,859 B1 * 2/2003 Yuge ....................... 296/146.4
6,550,839 B1 * 4/2003 Rogers et al. ................ 296/56
6,776,443 B1 * 8/2004 Shimura et al. .............. 296/56
2005/0017539 A1 * 1/2005 Ihashi et al. ............. 296/146.8

FOREIGN PATENT DOCUMENTS

JP 2004-196231 A * 7/2005 .................. 49/341

* cited by examiner

*Primary Examiner*—Lori L. Coletta
(74) *Attorney, Agent, or Firm*—Rankin, Hill, Porter & Clark LLP

(57) ABSTRACT

A power tailgate apparatus of the present invention includes: a curved arm of which one end side is connected to a tailgate; a rod of which one end side is connected to another end side of the curved arm; a rectilinearly moving rack connected to another end side of the rod; a driving power source arranged at a position adjacent to the rectilinearly moving rack; a driving force transfer part which transfers a driving power of the driving power source to the rectilinearly moving rack; and a guide having a curve that is concentric with the curved arm, which guides the curved arm along the curve.

1 Claim, 14 Drawing Sheets

POWER TAILGATE APPARATUS

BACKGROUND OF THE INVENTION

Priority is claimed on Japanese Patent Application No. 2003-282671, filed Jul. 30, 2003, and Japanese Patent Application No. 2003-288081, filed Aug. 6, 2003, the contents of which are incorporated herein by reference.

1. Field of the Invention

The present invention relates to a power tailgate apparatus that opens and closes a tailgate of a vehicle using electric power.

2. Description of Related Art

As a power tailgate apparatus that opens and closes a tailgate of a vehicle using electric power, a technology is known that opens and closes the tailgate that is connected to a curved arm by moving a rack gear in a longitudinal direction of a vehicle via a pinion gear using electric power, and turns a slide roller of the curved arm that is linked to the rear end side of the rack gear in an arc shape, while guiding it using a curved guide that has the same curvature as the curved arm (see, for example, U.S. Pat. No. 6,142,551 (this document is referred to below as "Patent Document 1")). In this power tailgate apparatus, the rack gear that turns the curved arm is able to move in the vehicle longitudinal direction while swinging in a vertical direction.

In the power tailgate apparatus disclosed in the Patent Document 1, because the rack gear that turns the curved arm is able to move in the vehicle longitudinal direction while swinging in a vertical direction, there is a problem that a cover that covers the rack gear on the vehicle interior side drops downwards, and it becomes difficult to secure sufficient head clearance above the head of a passenger. In addition, because the curved arm is connected to the rear end portion of the rack gear, it is necessary to provide an electric motor and a decelerator including the pinion gear in the vicinity of the tailgate aperture, and the space utilization of the area around the tailgate aperture is poor.

Accordingly, a first object of the present invention is to provide a power tailgate apparatus that can secure head clearance above the head of a passenger and can improve space utilization in the area around a tailgate aperture.

In addition, in the power tailgate apparatus disclosed in the Patent Document 1, because the slide roller of the curved arm that is linked to the rear end side of the rack gear is turned in an arc shape while being guided by a curved guide that has the same curvature as the curved arm, there is a problem that, in particular, in the initial opening action of the tailgate, considerable slide resistance is reduced, and thus that energy transfer performance for opening the tailgate is poor.

Accordingly, a second object of the present invention is to provide a power tailgate apparatus that can secure head clearance above the head of a passenger and can improve space utilization in the area around a tailgate aperture, and that can also reduce slide resistance in the initial stage of opening action of the tailgate.

SUMMARY OF THE INVENTION

In order to achieve the above described first object, a power tailgate apparatus of the present invention includes: a curved arm of which one end side is connected to a tailgate; a rod of which one end side is connected to another end side of the curved arm; a rectilinearly moving rack connected to another end side of the rod; a driving power source arranged at a position adjacent to the rectilinearly moving rack; a driving force transfer part which transfers a driving power of the driving power source to the rectilinearly moving rack; and a guide having a curve that is concentric with the curved arm, which guides the curved arm along the curve.

According to this power tailgate apparatus, because the rectilinearly moving rack that moves rectilinearly without swinging up and down is used, a cover that covers the rectilinearly moving rack on the vehicle interior side can be placed in a high position, and it is possible to secure head clearance above the head of a passenger. In addition, because the curved arm is connected to the rectilinearly moving rack via a rod, the driving power source and the driving force transfer part can be provided separately on the front side of the aperture of the tailgate, and it is possible to improve the space utilization in the area around the aperture of the tailgate.

The power tailgate apparatus may further includes: an inner side guide face and an outer side guide face each provided in the guide, and each having curves that are concentric with the curved arm; and a guide roller provided on a connection part between the curved arm and the rod, and guided by the inner side guide face and the outer side guide face by being sandwiched therebetween.

In this case, because a guide roller that is guided by the curved guide portion is provided on the connection part between the curved arm and the rod, it is possible to reduce the number of component parts.

In order to achieve the above described second object, a power tailgate apparatus includes: a power tailgate apparatus includes: a curved arm of which one end side is connected to a tailgate via a link shaft; a rod of which one end side is connected to another end side of the curved arm; a rectilinearly moving rack connected to another end side of the rod; a driving power source arranged at a position adjacent to the rectilinearly moving rack; a driving force transfer part which transfers a driving power of the driving power source to the rectilinearly moving rack; a slider provided on the rod; and a guide which guides movement of the slider along a movement trajectory whose radius of curvature is greater than that of a movement trajectory of the link shaft in an initial stage of an opening action of the tailgate.

According to this power tailgate apparatus, because rectilinearly moving rack that moves rectilinearly without swinging up and down is used, a cover that covers the rectilinearly moving rack on the vehicle interior side can be placed in a high position, and it is possible to secure head clearance above the head of a passenger. In addition, because the curved arm is connected to the rectilinearly moving rack via a rod, the driving power source and the driving force transfer part can be provided separately on the front side of the aperture of the tailgate, and it is possible to improve the space utilization in the area around the aperture of the tailgate. In addition, the guide can move the slider that is provided on the rod smoothly by guiding it so that it moves along a movement trajectory that is gentler than the movement trajectory of the link shaft in the initial stages of an opening action of the tailgate, or, in other words, in the final stages of a closing action of the tailgate. Accordingly, it is possible to improve the energy utilization efficiency of the movement of the slider, namely, of the opening and closing actions of the tail gate, in the initial stage of an opening action or in the final stage of a closing action (i.e., in the vicinity of where the door is completely shut) of the tailgate, when a particularly large amount of energy is required. In particular, in the final stages of a closing action (i.e., in the vicinity of where the door is completely shut)

where the sealing reaction force is considerable and substantial force is required, a closing action can be guided smoothly.

DETAILED DESCRIPTION OF THE INVENTION

A first embodiment of the power tailgate apparatus of the present invention will now be described with reference to the figures. Note that when “front” and “rear” are mentioned in the description given below, they referred to the front and rear when a vehicle is moving forward.

Figure 1:
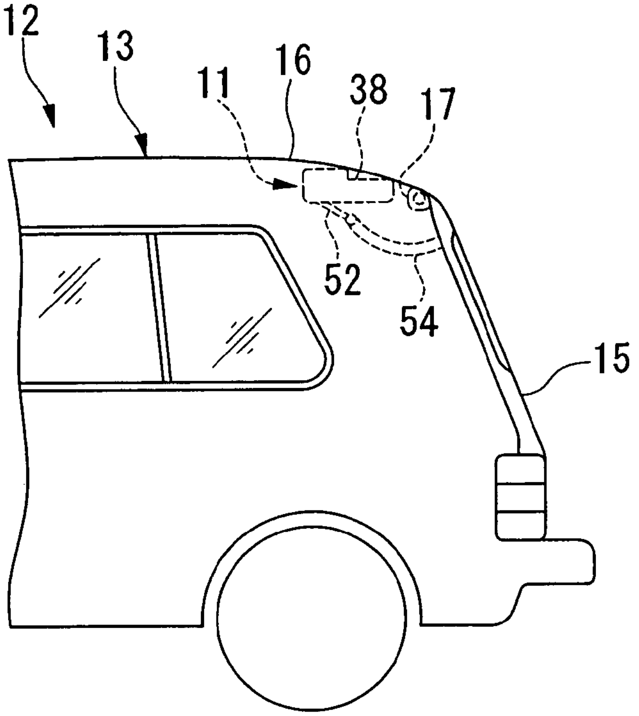
FIG. 1 is a side view of a vehicle rear portion having a power tailgate apparatus according to one embodiment of the present invention, and shows a state in which a tailgate is fully closed.
Figure 2:
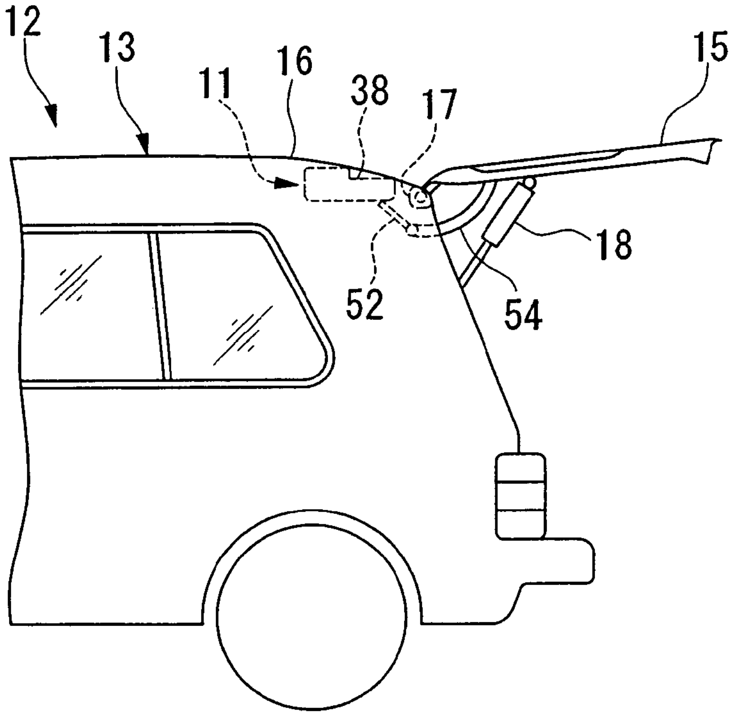
FIG. 2 is a side view of the same vehicle rear portion, and shows a state in which the tailgate is fully opened.

FIGS. 1 and 2 show a rear portion of a vehicle 12 having a power tailgate apparatus 11 of the present embodiment. A tailgate 15 that is openable and closable is provided at a rear end portion of the vehicle body 13. Namely, a hinge 17 is provided at a rear end portion of a roof portion 16 that forms a top portion of the vehicle body 13. The tailgate 15 is supported so as to swing around an axis extending along the vehicle transverse direction via this hinge 17. In addition, a gas type of outer stay 18 is connected to the tailgate 15. When the tailgate 15 is being opened or closed, the weight balance thereof is adjusted by an urging force of the outer stay 18. The tailgate 15 swings around a center of oscillation of the hinge 17 between the fully closed state shown in FIG. 1 and the fully open state shown in FIG. 2.

Figure 3:
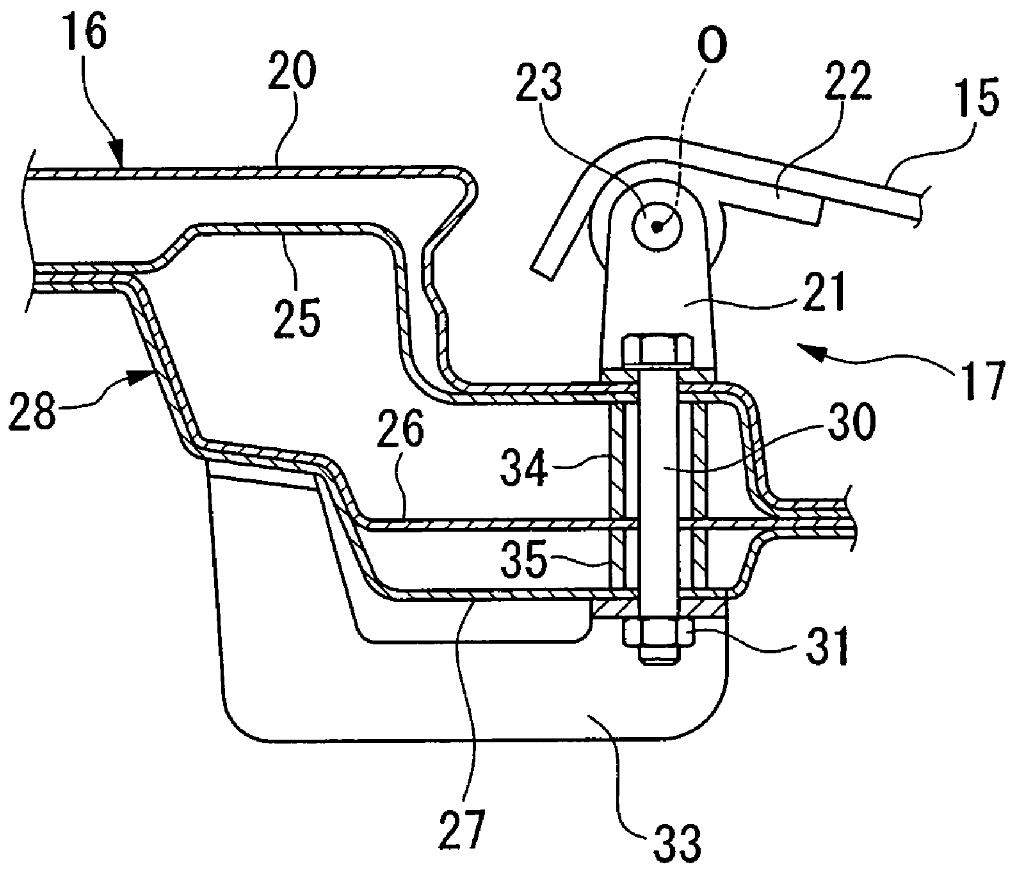
FIG. 3 is a side cross-sectional view of a hinge of the tailgate of the same vehicle.

As is shown in FIG. 3, the hinge 17 has a fixed member 21 that is fixed to a roof panel 20 of the roof portion 16, a swinging member 22 that is connected to the tailgate 15, and a hinge shaft 23 that rotatably connects therebetween. The fixed member 21 is attached via a hinge mounting bolt 30 and a nut 31 to a roof rail 28 that has a closed cross-sectional configuration and extends in the vehicle transverse direction, and is formed by the roof panel 20 of the roof portion 16 and a plurality of (specifically, three) panels 25, 26 and 27 located below the roof panel 20. A bracket 33 is also fastened by the hinge mounting bolt 30 on the underside of the roof rail 28. This bracket 33 is mounted on the hinge mounting bolt 30, and extends forwards so that the front side thereof is in contact with the underside of the roof rail 28. As a result, the mounting rigidity of the hinge 17 is improved. Note that collars 34 and 35 are provided in the roof rail 28 between the panels 25 and 26 and between the panels 26 and 27 so as to surround the hinge mounting bolt 30.

Figure 4:
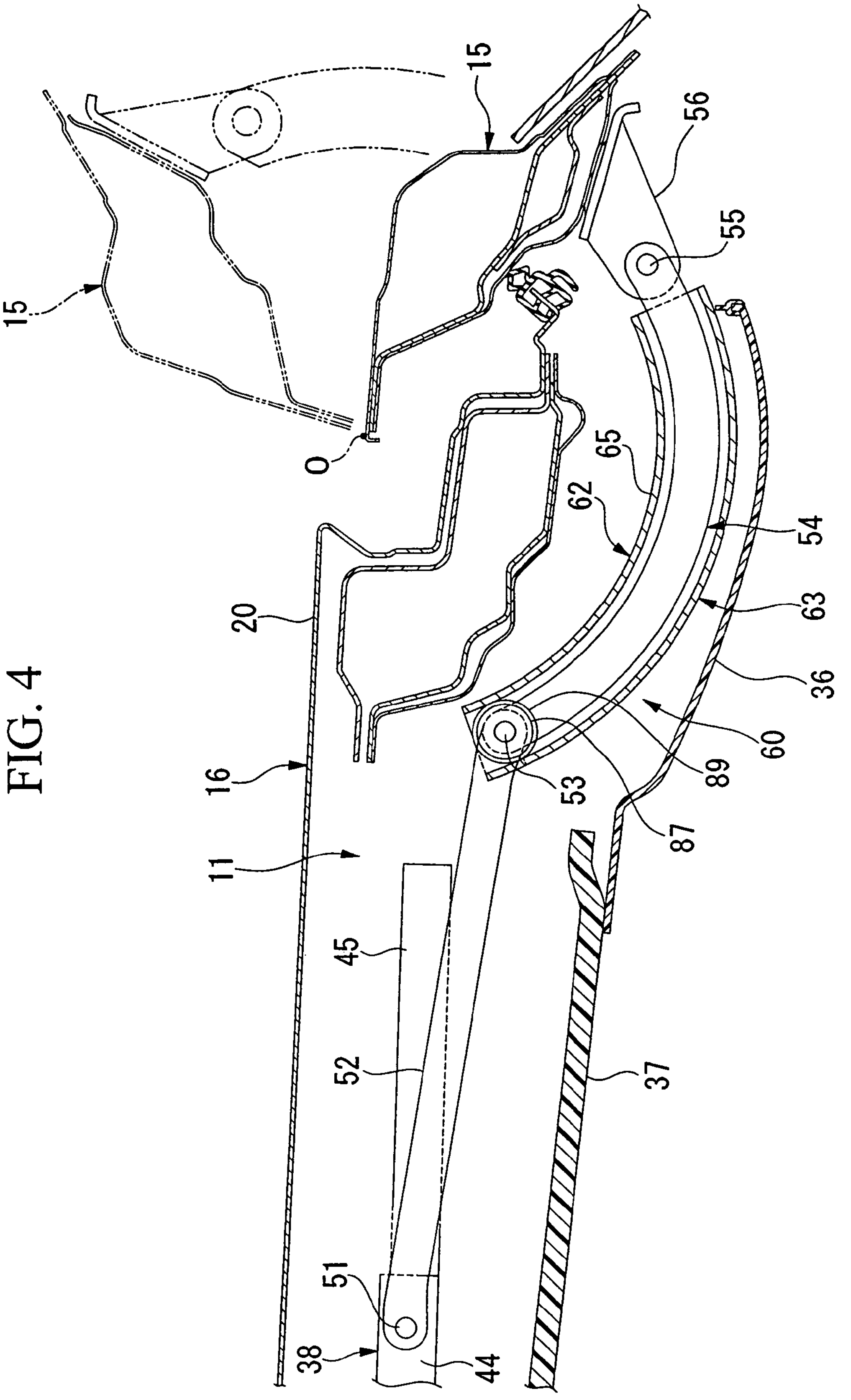
FIG. 4 is a side cross-sectional view of the same power tailgate apparatus in which the tailgate shown by a solid line shows closed state.

As is shown in FIG. 4, the power tailgate apparatus 11 of the present embodiment is provided in the roof portion 16 of the vehicle body 13 in order to automatically open and close the tailgate 15. This power tailgate apparatus 11 is provided between the roof panel 20 of the roof portion 16 and an inner cover 36 and roof lining 37.

Figure 5:
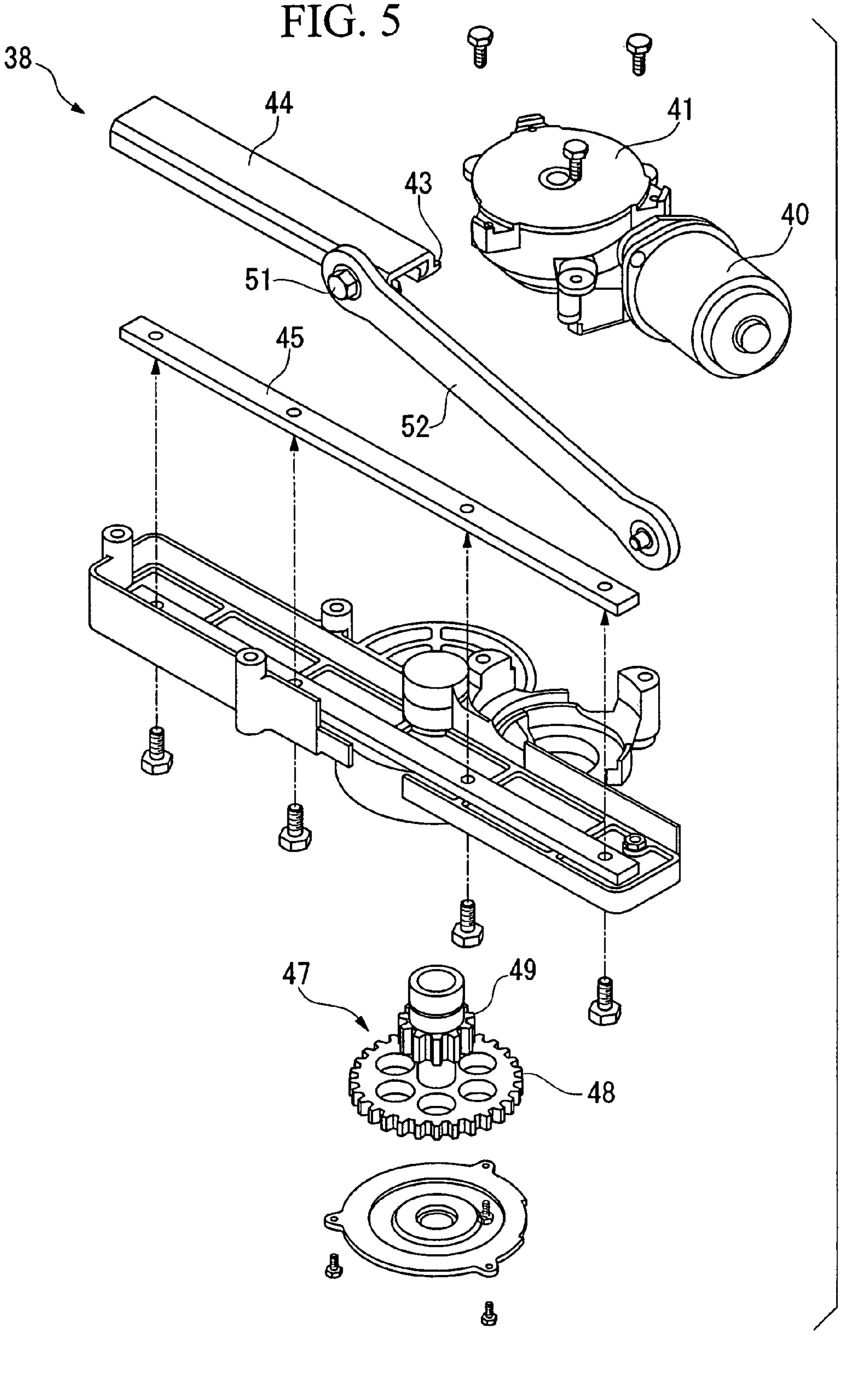
FIG. 5 is an exploded perspective view of a drive mechanism portion of the same power tailgate apparatus.
Figure 6:
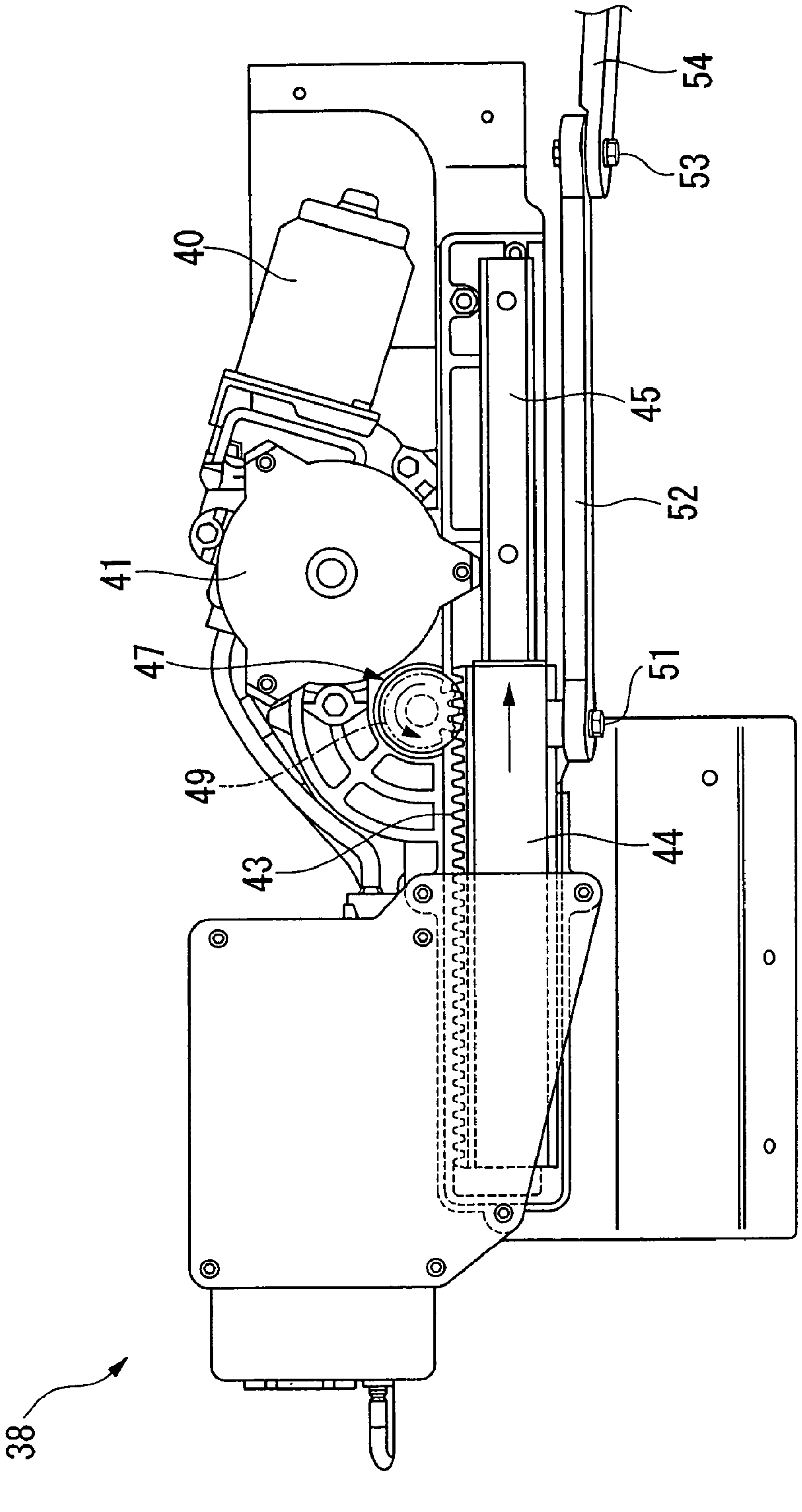
FIG. 6 is a plan view of the same drive mechanism portion.

As is shown in FIGS. 5 and 6, a drive mechanism portion 38 of the power tailgate apparatus 11 has an electric motor (driving power source) 40 and a gearbox (driving power transfer part) 41. Worm gears and wheel gears (not shown) are provided inside the gearbox 41 in order to appropriately reduce the rotation speed of the electric motor 40.

In addition, the drive mechanism portion 38 has a rectilinear shaped rack 44 that has a gear portion 43 formed in a side surface at one side in the transverse direction of the vehicle, and a guide rail 45 that supports the rack 44 such that the longitudinal direction of the rack 44 is aligned in the vehicle longitudinal direction, and that guides the rack 44 such that the rack 44 is able to slide rectilinearly in the vehicle longitudinal direction. Therefore, the rack 44 forms a direct movement type of rack that is able to move rectilinearly.

Furthermore, the drive mechanism portion 38 has a transmission gear (driving power transfer part) 47 between the gearbox 41 and the rack 44. An intermediate gear portion 48 that is rotated by an output from the gearbox 41 and a pinion gear portion 49 that meshes with the gear portion 43 of the rack 44, are formed coaxially on the transmission gear 47.

The drive mechanism portion 38 rotates the transmission gear 47 via the gearbox 41 by reciprocally rotating the electric motor 40. The drive mechanism portion 38 consequently reciprocally moves the rack 44, whose gear portion 43 meshes with the pinion gear 49 of the transmission gear 47, in the vehicle longitudinal direction along the guide rail 45. Namely, the drive mechanism portion 38 converts a rotation movement of the electric motor 40 into a rectilinear movement of the rack 44.

A link shaft 51 that extends in the vehicle transverse direction is mounted on a side surface of the rack 44 on the opposite side from the gear portion 43. One end side of a rectilinear rod 52 is rotatably connected to the rack 44 via this link shaft 51. Moreover, as is shown in FIG. 4, one end side of a curved arm 54, which curves in a downward protruding arc shape, is rotatably connected via a link shaft 53 extending along the vehicle transverse direction, to the other end side of the rod 52. Furthermore, a bracket 56 that is fixed to the tailgate 15 is rotatably connected to the other end side of the curved arm 54 via a link shaft 55 extending along the vehicle transverse direction. Note that the curved arm 54 is supported by a vehicle side curved guide portion 60 so as to be concentric with the vehicle side curved guide portion 60. The curved arm 54 forms an arc shape centered on the center of oscillation O of the hinge 17, and the curved arm 54 moves in an arc shape around the center of oscillation O of the hinge 17.

Figure 7:
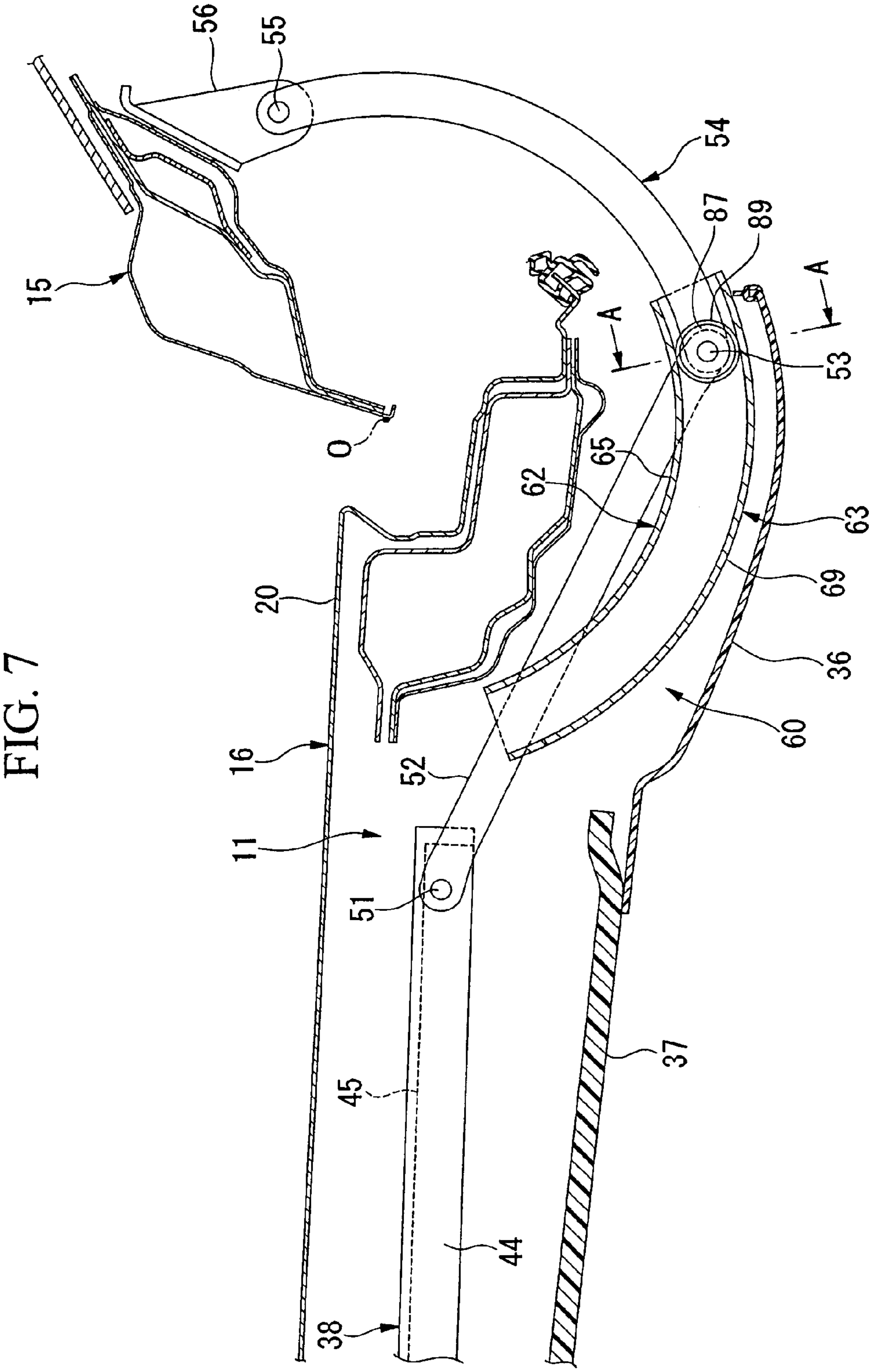
FIG. 7 is a side cross-sectional view of the same power tailgate apparatus in which the tailgate is in an opened state.

In the drive mechanism portion 38, the rack 44 slides rectilinearly by the driving of the electric motor 40, resulting in the link shaft 51 of the rack 44 moving rectilinearly in the vehicle longitudinal direction. As a result, when the rack 44 slides backwards, the rod 52 is rotated around the link shaft 51 and moves backwards, and the curved arm 54 rotates around the link shaft 53 and is turned in an arc shape so as to push the tailgate 15. Accordingly, the tailgate 15 is opened so that the state shown in FIG. 4 is changed to the state shown in FIG. 7. Conversely, if the rack 44 slides forward by the driving of the electric motor 40, the curved arm 54, which is pulled via the rod 52, is turned in an arc shape so as to pull the tailgate 15. The tailgate 15 is closed so that the state shown in FIG. 7 is changed to the state shown in FIG. 4. As is shown in FIG. 7, a position at which the rack 44 has been made to slide to a rear end position forms the completely open position of the tailgate 15, while, as is shown in FIG. 4, a position at which the rack 44 has been made to slide to a front end position forms the completely closed position of the tailgate 15.

As is shown in FIG. 4, in a state in which the rack 44 is in the front end position and the tailgate 15 is in a completely closed position, the rod 52 extends from the position of the link shaft 51 of the rack 44 towards the rear and in a slightly downwardly inclined direction. Namely, in a state in which the tailgate 15 is in a completely closed position, the link shaft 53 at the rear end of the rod 52, or in other words at the front end of the curved arm 54, is positioned further to the rear and slightly below the link shaft 51 at the front end of the rod 52.

Moreover, as is shown in FIG. 4, in a state in which the tailgate 15 is in a completely closed position, the curved arm 54 is curved in a downward protruding arc, and extends towards the rear and slightly downwards from the position of the link shaft 53. Namely, in a state in which the tailgate 15 is in a completely closed position, the link shaft 55 at the rear end of the curved arm 54 is positioned further to the rear and slightly below the link shaft 53 at the front end of the curved arm 54. In addition, in a state in which the tailgate 15 is in a completely closed position, the link shaft 53 at the front end of the curved arm 54 and the link shaft 55 at the rear end of the curved arm 54 are positioned above a bottom end portion of the curved arm 54.

On the other hand, as is shown in FIG. 7, in a state in which the rack 44 is in the rear end position and the tailgate 15 is in a completely open position, the rod 52 extends from the position of the link shaft 51 of the rack 44 towards the rear and in a slightly downwardly inclined direction. Namely, in a state in which the tailgate 15 is in a completely open position, the link shaft 53 at the rear end of the rod 52, or in other words at the front end of the curved arm 54, is positioned further to the rear and slightly below the link shaft 51 at the front end of the rod 52. The position of the link shaft 53 in a state in which the tailgate 15 is in a completely open position, is further to the rear and slightly below the position of the link shaft 53 in a state in which the tailgate 15 is in a completely closed position.

Moreover, as is shown in FIG. 7, in a state in which the tailgate 15 is in a completely open position, the curved arm 54 is curved in a downward protruding arc, and extends towards the rear and above the position of the link shaft 53. Namely, the link shaft 55 at the rear end of the curved arm 54 when the tailgate 15 is in a completely open position, is positioned further to the rear and above the link shaft 53 at the front end of the curved arm 54. The position of the link shaft 55 in a state in which the tailgate 15 is in a completely open position is slightly further to the rear and above the position of the link shaft 55 in a state in which the tailgate 15 is in a completely closed position.

In the present embodiment, a metal curved guide portion 60, which is concentric with the curved arm 54, namely, which is curved in an arc shape centering on the center of oscillation O of the hinge 17, is fixed to the vehicle 13 side as is described above. This curved guide portion 60 guides the curved arm 54 on an inner side (i.e., on the center of oscillation O side of the hinge 17) and on an outer side (i.e., on the opposite side from the center of oscillation O side of the hinge 17) of the curvature thereof over a full range between a state in which the tailgate 15 is in a completely closed position and a state in which the tailgate 15 is in a completely open position.

Figure 8:
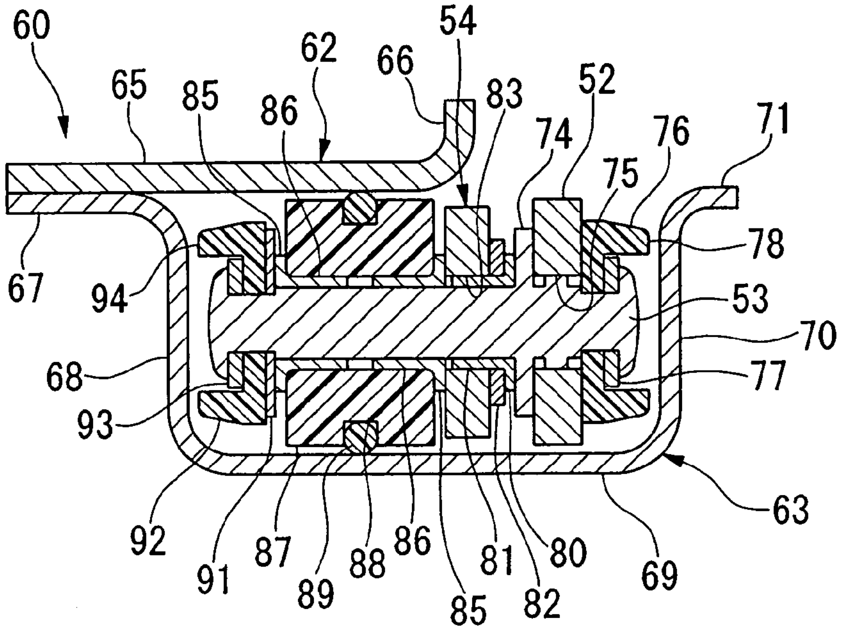
FIG. 8 is a cross-sectional view along the line A—A shown in FIG. 7.

As is shown in FIG. 8, the curved guide portion 60 has an inner side guide member 62 that is positioned on an inner side of the curvature of the curved guide portion 60, namely, on an upper side thereof, and an outer side guide member 63 that is positioned on an outer side of the curvature of the curved guide portion 60, namely, on a lower side thereof.

The inner side guide member 62 has a guide plate portion 65 that extends in the vehicle transverse direction, and an upright plate portion 66 that extends slightly from one end side in the vehicle transverse direction of the guide plate portion 65 on the inner side in the direction of the curvature of the curved guide portion 60, namely, on the upper side thereof.

The outer side guide member 63 has a bonding plate portion 67 that is bonded to a portion on the opposite side from the upright plate portion 66 in the vehicle transverse direction of the inner side guide member 62, a wall plate portion 68 that extends in an outer side direction of the curvature of the curved guide portion 60, namely, in a lower side direction so as to form a right angle from the side of the upright plate portion 66 in the vehicle transverse direction of the bonding plate portion 67, a guide plate portion 69 that extends from the wall plate portion 68 on the opposite side to the bonding plate portion 67 in the vehicle transverse direction on the opposite side from the bonding plate portion 67, a wall plate portion 70 that extends from the guide plate portion 69 on the opposite side to the wall plate portion 68 in an inner side direction of the curvature of the curved guide portion 60, namely, in an upward direction, and a distal end plate portion 71 that extends from the wall plate portion 70 on the opposite side to the guide plate portion 69 on the opposite side to the guide plate portion 69 in the vehicle transverse direction. Note that the wall plate portions 68 and 70 are parallel to each other, and the guide plate portions 65 and 69 have different diameters but are concentric with each other.

The link shaft 53 that connects the curved arm 54 and the rod 52 is provided in the inner space enclosed by the curved guide portion 60. A flange portion 74 is formed at a central position in the longitudinal direction on the link shaft 53. A hole 75 of the rod 52 is fitted on the wall plate portion 70 side of the flange portion 74. In addition, an annular slider 76 made of resin is fitted onto the link shaft 53 on the wall plate portion 70 side of the rod 52. A washer 77 is also fitted on the wall plate portion 70 side of the slider 76. In this state, the portion of the link shaft 53 that protrudes from the washer 77 is crimped so that withdrawal of the members on the wall portion 70 side from the flange portion 74 is restricted. Note that the slider 76 has a facing portion 78 that protrudes in a ring shape on the wall plate portion 70 side of the link shaft 53.

In contrast, a bush 81 having a flange 80 at one side in the axial direction thereof is fitted onto the link shaft 53 on the wall plate portion 68 side of the flange portion 74 in a state in which the flange portion 80 is in contact with the flange portion 74. A washer 82 is fitted on the bush 81 so as to be in contact with the flange portion 80, and the curved arm 54 is fitted via the hole 83 therein so as to be in contact with the washer 82. In addition, a pair of bushes 86 that have flange portions 85 at one side in the axial direction thereof are fitted on the link shaft 53 on the wall plate portion 68 side of the curved arm 54. A guide roller 87 is fitted onto these bushes 86 so as to be sandwiched by the flange portions 85. The guide roller 87 has an annular concave portion 88 on an outer circumferential surface thereof, and has a resin ring 89 that is removably (i.e., replaceably) fitted in this concave portion 88.

Furthermore, a washer 91 is fitted onto the link shaft 53 so as to be in contact with the flange portion 85 of the bush 86 on the wall plate portion 68 side. An annular slider 92 made of resin is fitted on the wall plate 98 side of the washer 91. In this state, the portion of the link shaft 53 that protrudes from the washer 93 is crimped so that withdrawal of the members on the wall portion 68 side from the flange portion 74 is restricted. Note that the slider 92 has a facing portion 94 that protrudes in a ring shape on the wall plate portion 68 side of the link shaft 53.

The curved guide portion 60 guides turning that is centered around the center of oscillation O of the guide roller 87 that is provided on the link shaft 53 that connects the curved arm 54 and the rod 52 using the guide plate portion 65 on the inner side of the curvature of the curved guide portion 60, namely, on the upper side and by the guide plate portion 69 on the outer side of the curvature of the curved guide portion 60, namely, on the lower side. In addition, the curved guide portion 60 guides turning that is centered around the center of oscillation O of the curved arm 54 via the guide roller 87. Moreover, as a result of the facing portions 78 and 94 of the sliders 76 and 92 being guided by the wall plate portion 68 and the wall plate portion 70 on both sides thereof in the vehicle transverse direction, movement in the vehicle transverse direction of the curved guide portion 60 is restricted.

Moreover, as has been described above, when the rod 52 is moved as a result of the rack 44 being made to slide rectilinearly by the drive of the electric motor 40 in the drive mechanism portion 38, the curved arm 54 is turned via the link shaft 53 and the tailgate 15 is opened and closed, however, at this time, the guide roller 87 that is connected to the rod 52 and the curved arm 54 via the link shaft 53 is guided by the curved guide portion 60 and turns in an arc shape. As a result of the curved guide portion 60 guiding the guide roller 87 in this way, when opening or closing the tailgate 15, the load that is input into the rod 52 via the curved arm 54 and the load that is input into the curved arm 54 via the rod 52 can be received by the curved guide portion 60.

According to the power tailgate apparatus 11 of the present embodiment, which has been described above, because the rack 44 that moves rectilinearly without swinging up and down is used, the inner cover 36 and the roof lining 37, which cover the rack 44 on the vehicle interior side, can be placed in higher positions, and it is possible to secure head clearance above the head of a passenger.

In addition, because the curved arm 54 is connected to the rack 44 via the rod 52, the electric motor 40 and gear box 41 including the pinion gear portion 49 can be provided separately on the forward side of the aperture of the tailgate 15, and it is possible to improve the space utilization in the area around the aperture of the tailgate 15.

Moreover, because the guide roller 87 that is guided by the curved guide portion 60 is provided on the link shaft 53 that connects the curved arm 54 and the rod 52, the number of component parts can be reduced.

Furthermore, because the guide roller 87 has the removable resin ring 89 on a portion thereof that slides against the curved guide portion 60, which is the outer circumferential side thereof, even if abrasion occurs, it is sufficient if only the ring 89 is replaced, so that costs can be kept low.

The second embodiment of the power tailgate apparatus of the present invention will now be described with reference to the figures. Note that when "front" and "rear" are mentioned in the description given below, they referred to the front and rear when a vehicle is moving forward.

Figure 9:
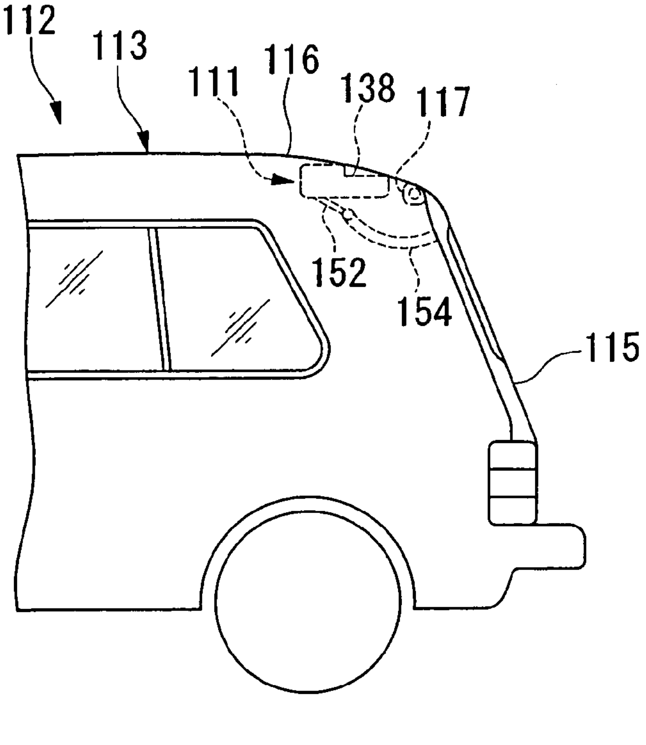
FIG. 9 is a side surface view of a vehicle rear portion having a power tailgate apparatus according to another embodiment of the present invention, and shows a state in which the tailgate is fully closed.
Figure 10:
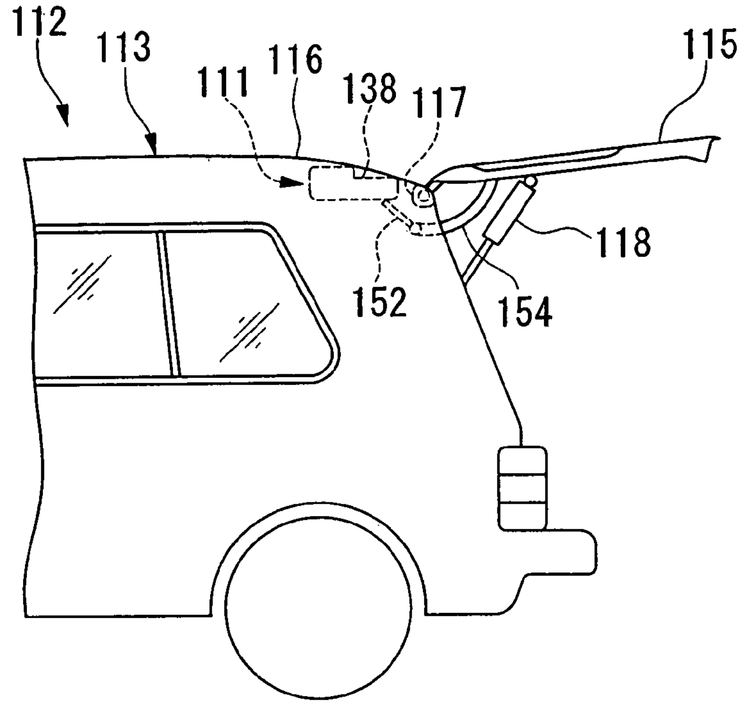
FIG. 10 is a side cross-sectional view of the same vehicle rear portion, and shows a state in which the tailgate is fully opened.

FIG. 9 and FIG. 10 show a rear portion of a vehicle 112 having a power tailgate apparatus 111 of the present embodiment. A tailgate 115 that can be opened and closed is provided at a rear end portion of the vehicle body 113. Namely, a hinge 117 is provided at a rear end portion of a roof portion 116 that forms a top portion of the vehicle body 113. The tailgate 115 is supported so as to be able to swing around an axis that runs in the vehicle transverse direction via this hinge 117. In addition, a gas type of outer stay 118 is connected to the tailgate 115. When the tailgate 115 is being opened or closed, the weight balance thereof is adjusted by an urging force from the outer stay 118. The tailgate 115 swings around a center of oscillation of the hinge 117 between the fully closed state shown in FIG. 9 and the fully open state shown in FIG. 10.

Figure 11:
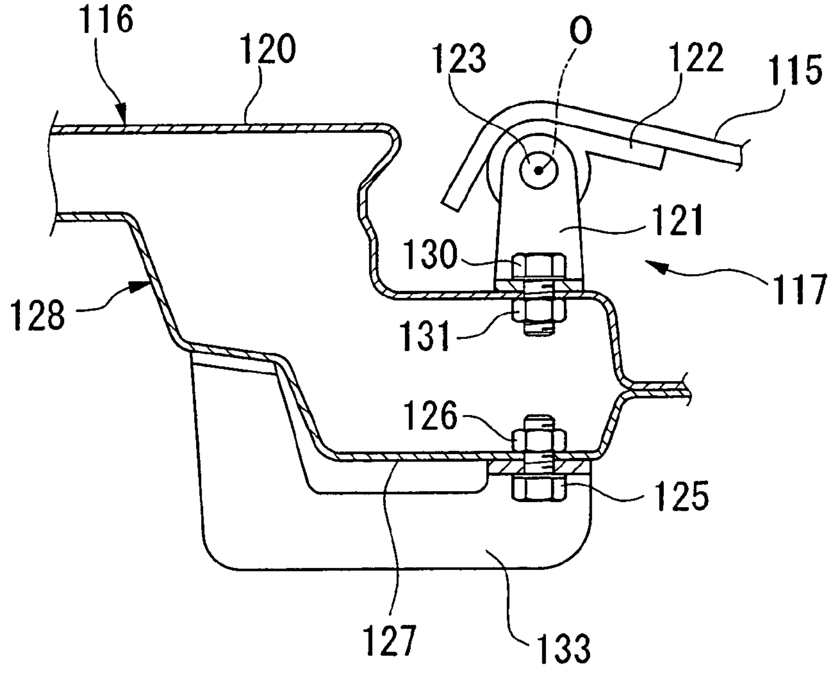
FIG. 11 is a side cross-sectional view of a hinge of the tailgate of the same vehicle.

As is shown in FIG. 11, the hinge 117 has a fixed member 121 that is fixed to a roof panel 120 of the roof portion 116, a swinging member 122 that is connected to the tailgate 115, and a hinge shaft 123 that links these such that they can be rotated. The fixed member 121 is attached via a hinge mounting bolt 130 and a nut 131 to a roof rail 128 that has a closed cross-sectional configuration and extends in the vehicle transverse direction, and is formed by the roof panel 120 of the roof portion 116 and a panel 127 located below the roof panel 120. A bracket 133 is attached by a mounting bolt 125 and nut 126 to the underside of the roof rail 128. This bracket 133 is attached by the mounting bolt 125 and nut 126, and extends forwards so that the front side thereof is in contact with the underside of the roof rail 128. As a result, the mounting rigidity of the hinge 117 is improved.

Figure 12:
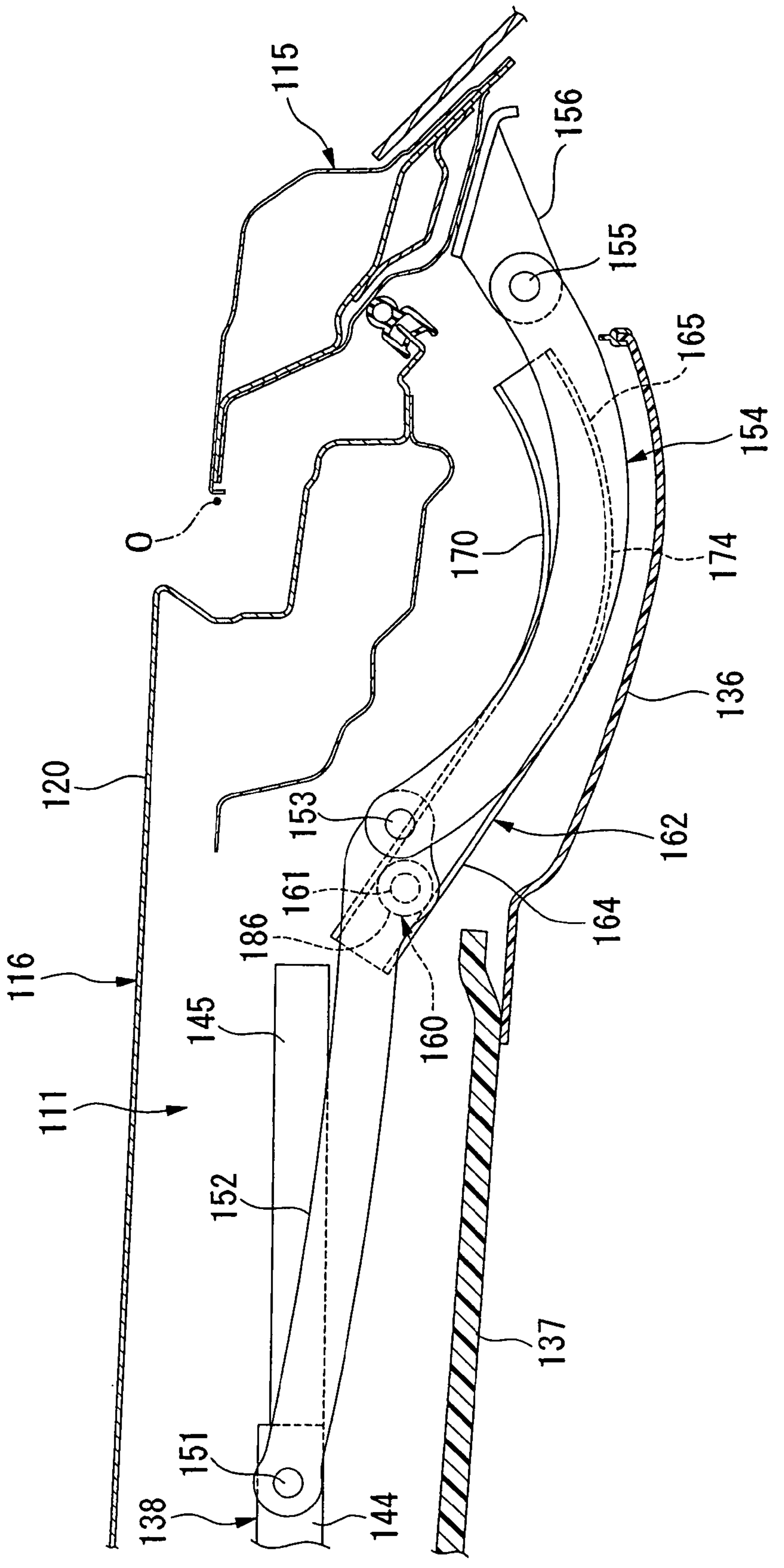
FIG. 12 is a side cross-sectional view of the same power tailgate apparatus, and shows a state in which the tailgate is fully closed.

As is shown in FIG. 12, the power tailgate apparatus 111 of the present embodiment is provided in the roof portion 116 of the vehicle body 113 in order to automatically open and close the tailgate 115. This power tailgate apparatus 111 is provided between the roof panel 120 of the roof portion 116 and an inner cover 136 and roof lining 137.

Figure 13:
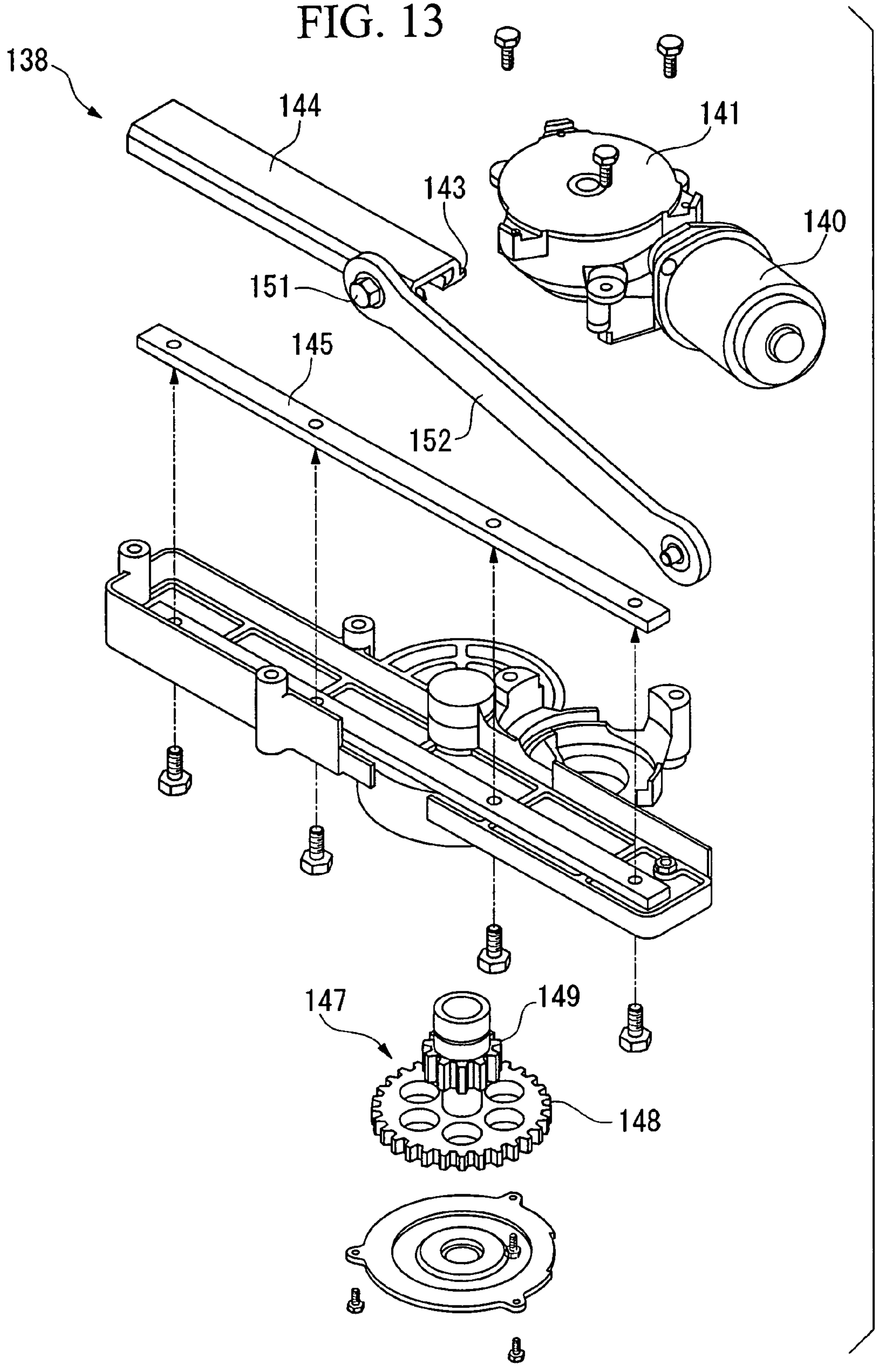
FIG. 13 is an exploded perspective view of a drive mechanism portion of the same power tailgate apparatus.
Figure 14:
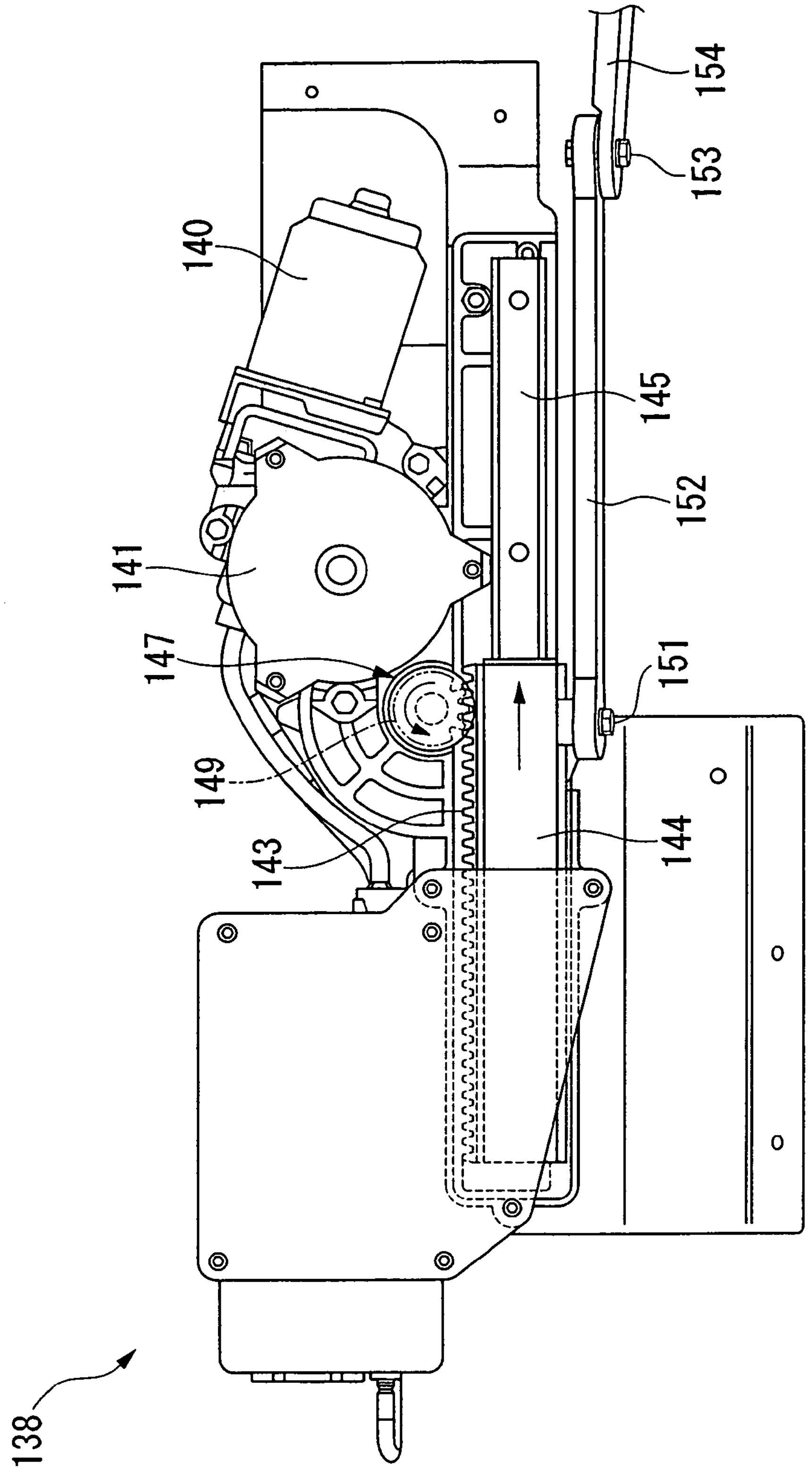
FIG. 14 is a plan view of the same drive mechanism portion.

As is shown in FIGS. 13 and 14, a drive mechanism portion 138 of the power tailgate apparatus 111 has an electric motor (driving power source) 140 and a gearbox (driving power transfer part) 141. Worm gears and wheel gears (not shown) are provided inside the gearbox 141 and these appropriately reduce the rotation speed of the electric motor 140.

In addition, the drive mechanism portion 138 has a rectilinear shaped rack 144 that has a gear portion 143 formed in a side surface at one side in the transverse direction of the vehicle, and a guide rail 145 that supports the rack 144 such that the longitudinal direction of the rack 144 is aligned in the vehicle longitudinal direction, and that guides the rack 144 such that the rack 144 is able to slide rectilinearly in the vehicle longitudinal direction. As a result, the rack 144 forms a rectilinear movement type of rack that is able to move rectilinearly.

Furthermore, the drive mechanism portion 138 has a transmission gear (driving power transfer part) 147 between the gearbox 141 and the rack 144. An intermediate gear portion 148 that is rotated by an output from the gearbox 141 and a pinion gear portion 149 that meshes with the gear portion 143 of the rack 144 are formed coaxially on the transmission gear 147.

The drive mechanism portion 138 rotates the transmission gear 147 via the gearbox 141 by reciprocally rotating the electric motor 140. The drive mechanism portion 138 consequently reciprocally moves the rack 144, whose gear portion 143 meshes with the pinion gear 149 of the transmission gear 147, in the vehicle longitudinal direction along the guide rail 145. Namely, the drive mechanism portion 138 converts a rotational movement of the electric motor 140 into a rectilinear movement of the rack 144.

A link shaft 151 that extends in the vehicle transverse direction is mounted on a side surface of the rack 144 on the opposite side from the gear portion 143. One end side of a rectilinear rod 152 is rotatably connected to the rack 144 via this link shaft 151. Moreover, as is shown in FIG. 12, one end side of a curved arm 154, which curves in a downward protruding arc shape, is rotatably connected via a link shaft 153, which extends in the vehicle transverse direction, to the other end side of the rod 152. Furthermore, a bracket 156 that is fixed to the tailgate 115 is rotatably connected to the other end side of the curved arm 154 via a link shaft 155, which extends in the vehicle transverse direction. The curved arm 154 forms an arc shape whose radius is the length connecting the center of oscillation O of the hinge 117 and the link shaft 155 on the tailgate 115 side.

A slider 160 is provided via a supporting shaft 161, which extends in the vehicle transverse direction, at a different position on the rod 152 from that of the link shaft 153 so as to be freely rotatable around the supporting shaft 161. This slider 160 is supported such that movement thereof is guided by a guide 162 that is fixed to the vehicle body 113 side. As a result, by guiding the slider 160, the guide 162 moves the link shaft 153 of the rod 152 forward and backward along a predetermined movement trajectory.

Figure 15:
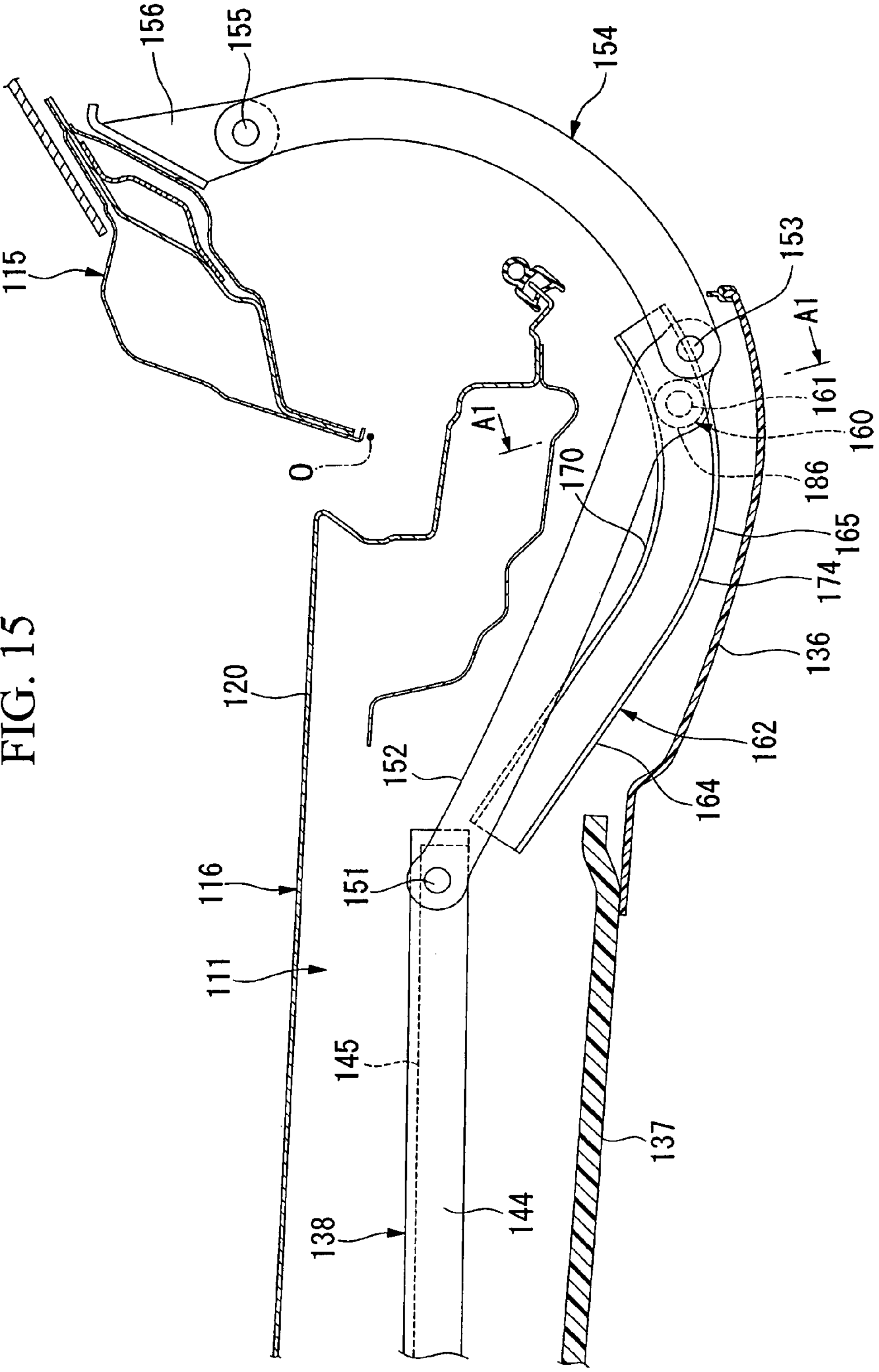
FIG. 15 is a side cross-sectional view of the same power tailgate apparatus, and shows a state in which the tailgate is fully opened.

In the drive mechanism portion 138, the rack 144 is made to slide rectilinearly by the driving of the electric motor 140, resulting in the link shaft 151 of the rack 144 moving rectilinearly in the vehicle longitudinal direction. As a result, when the rack 144 slides backwards, the rod 152 is swung around the link shaft 151 and moves backwards, and the curved arm 154 is rotated around the link shaft 153 and is turned substantially in an arc shape so as to push the tailgate 115. Accordingly, the tailgate 115 is opened so that the state shown in FIG. 12 is changed to the state shown in FIG. 15. Conversely, if the rack 144 is made to slide forward by the driving of the electric motor 140, the curved arm 154, which is pulled via the rod 152, is turned substantially in an arc shape so as to pull the tailgate 115. Accordingly the tailgate 115 is closed so that the state shown in FIG. 15 is changed to the state shown in FIG. 12. As is shown in FIG. 15, a position at which the rack 144 has been made to slide to a rear end position forms the completely open position of the tailgate 115, while, as is shown in FIG. 12, a position at which the rack 144 has been made to slide to a front end position forms the completely closed position of the tailgate 115.

As is shown in FIG. 12, in a state in which the rack 144 is in the front end position and the tailgate 115 is in a completely closed position, the rod 152 extends from the position of the link shaft 151 of the rack 144 towards the rear and in a slightly downwardly inclined direction. Namely, in a state in which the tailgate 115 is in a completely closed position, the link shaft 153 at the rear end of the rod 152, or in other words at the front end of the curved arm 154, is positioned further to the rear and slightly below the link shaft 151 at the front end of the rod 152.

Moreover, as is shown in FIG. 12, in a state in which the tailgate 115 is in a completely closed position, the curved arm 154 is curved in a downward protruding arc, and extends towards the rear from the position of the link shaft 153. Namely, in a state in which the tailgate 115 is in a completely closed position, the link shaft 155 at the rear end of the curved arm 154 is positioned further to the rear and slightly below the link shaft 153 at the front end of the curved arm 154. In addition, in a state in which the tailgate 115 is in a completely closed position, the link shaft 153 at the front end of the curved arm 154 and the link shaft 155 at the rear end of the curved arm 154 are positioned above a bottom end portion of the curved arm 154.

Furthermore, as is shown in FIG. 12, in a state in which the tailgate 115 is in a completely closed position, the slider 160 is positioned in front of and slightly below the link shaft 153.

On the other hand, as is shown in FIG. 15, in a state in which the rack 144 is in the rear end position and the tailgate 115 is in a completely open position, the rod 152 extends from the position of the link shaft 151 of the rack 144 towards the rear and in a slightly downwardly inclined direction. Namely, in a state in which the tailgate 115 is in a completely open position, the link shaft 153 at the rear end of the rod 152, or in other words at the front end of the curved arm 154, is positioned further to the rear and slightly below the link shaft 151 at the front end of the rod 152. The position of the link shaft 153 in a state in which the tailgate 115 is in a completely open position is further to the rear and slightly below the position of the link shaft 153 in a state in which the tailgate 115 is in a completely closed position.

Moreover, as is shown in FIG. 15, in a state in which the tailgate 115 is in a completely open position, the curved arm 154 is curved in a downward protruding arc, and extends slightly towards the rear and above the position of the link shaft 153. Namely, the link shaft 155 at the rear end of the curved arm 154 when the tailgate 115 is in a completely open position, is positioned slightly further to the rear and above the link shaft 153 at the front end of the curved arm 154. The position of the link shaft 155 in a state in which the tailgate 115 is in a completely open position, is slightly further to the rear and above the position of the link shaft 155 in a state in which the tailgate 115 is in a completely closed position.

Furthermore, as is shown in FIG. 15, in a state in which the tailgate 115 is in a completely open position, the slider 160 is positioned in front of and slightly above the link shaft 153.

In the present embodiment, when the link shaft 151 is driven by the rack 144 of the drive mechanism portion 138 and moves rectilinearly in the longitudinal direction, the rod 152 whose front end side is connected to the link shaft 151 is moved in the longitudinal direction. A metal guide 162 is fixed to the vehicle body 113 side, which makes the link shaft 153 at the rear end portion of the rod 152 move in the longitudinal direction and makes the curved arm 154 connected and supported on the link shaft 153 move, by guiding the slider 160 provided at the rear portion of the rod 152.

In this guide 162, a front guide portion 164, which is in the front of the guide 162, has a configuration that slopes substantially rectilinearly so as to be in a lower position as it approaches the rear. A rear guide portion 165, which is in the rear of the guide 162 has a downwardly protruding curved configuration that, after being in a lower position as it approaches the rear, thereafter is in a higher position approaching the rear.

The guide 162 guides the slider 160 of the rod 152 on an inner side (i.e., on the center of oscillation O side of the hinge 117) and on an outer side (i.e., on the opposite side from the center of oscillation O side of the hinge 117) of the curvature thereof over a full range between a state in which the tailgate 115 is in a completely closed position and a state in which the tailgate 115 is in a completely open position. The guide 162 guides the initial stage of the opening action and the final stage of the closing action of the tailgate 115 using the front guide portion 164. In addition, the guide 162 guides the final stage of the opening action and the initial stage of the closing action of the tailgate 115 using the rear guide portion 165. In the initial stages of the opening action of the tailgate 115, the guide 162 guides the slider 160 along a substantially rectilinear movement trajectory that is gentler than the arc-shaped movement trajectory that is centered on the center of oscillation O of the link shaft 155 on the tailgate 115 side.

Figure 16:
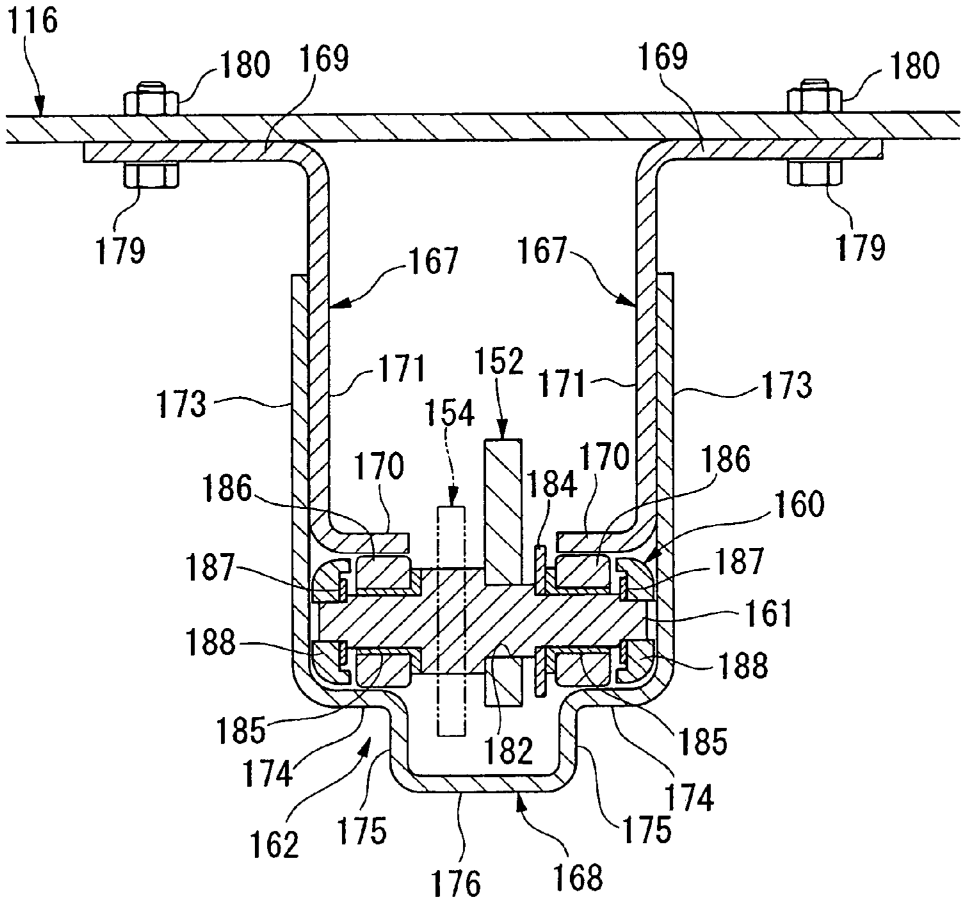
FIG. 16 is a cross-sectional view along the line A1—A1 shown in FIG. 15.

As is shown in FIG. 16, the guide 162 has a pair of inner side guide members 167 that are positioned on an inner side of the curvature of the guide 162, namely, on an upper side thereof, and an outer side guide member 168 that is positioned on an outer side of the curvature of the guide 162, namely, on a lower side thereof.

The inner side guide members 167 each has a guide plate portion 170 that extends in the vehicle transverse direction, an upright plate portion 171 that protrudes slightly from one end side in the vehicle transverse direction of the guide plate portion 170 on the inner side in the direction of the curvature of the guide 162, namely, on the upper side thereof, and a mounting plate portion 169 that extends in the vehicle transverse direction.

The outer side guide member 168 has a pair of wall plate portions 173 that join outer side portions in the vehicle transverse direction of the upright plate portion 171 of the inner side guide member 167 to the inner side of the wall plate portions 173; guide plate portions 174 that extend in a direction approaching each other such that they extend in the vehicle transverse direction from the outer side in the curvature direction of the guide 162, namely, from the lower side of the wall plate portions 173; extended plate portions 175 that extend from the sides of the guide plate portions 174 that are approaching each other to the outer side in the curvature direction, namely, to the lower side of the guide 162; and a link plate portion 176 that extends in the vehicle transverse direction so as to connect together the outer sides in the curvature direction of the guide 162, namely, the lower sides of the extended plate portions 175. Note that the wall plate portions 173 of the outer side guide member 168 are parallel to each other, and the guide plate portions 170 and 174 of the inner side guide members 167 and the outer side guide member 168 have similar configurations when viewed along the vehicle transverse direction.

Note also that in the guide 162, the mounting plate portions 169 of the inner side guide member 167 are each mounted on a rear end of the roof portion 116 using bolts 179 and nuts 180.

The slider 160 that is supported by the rod 152 is provided inside a space enclosed by the two guide plate portions 170 of the two inner side guide members 167 of the guide 162, the guide plate portions 174 on two sides of the outer side guide member 168, and the wall plate portions 173 on two sides of the outer side guide member 168.

The slider 160 has a supporting shaft 161, and the hole 182 of the rod 152 is rotatably fitted onto the supporting shaft 161 at an intermediate position in the longitudinal direction thereof. The slider 160 also has a washer 184 that is fitted on the supporting shaft 161 at a position adjacent to the rod 152; bushes 185 that are each fitted on the supporting shaft 161 at outer sides of the rod 152 and the washer 184; resin slide rollers 186 that are fitted onto each of the bushes 185; washers 187 that are each fitted on the supporting shaft 161 on the opposite side of the slide rollers 186 to the rod 152; and facing slide members 188 that are made of resin, and that are each fitted on the supporting shaft 161 on the opposite side of the washers 187 to the rod 152, and that face the corresponding wall plate portion 173. Note that the curved arm 154 is placed adjacent to the rod 152 at an intermediate position between the slide rollers 186 on both sides thereof in the vehicle transverse direction.

The guide 162 guides movement of the two slide rollers 186 provided on the supporting shaft 161 of the slider 160 of the rod 152 using the two guide plate portions 170 on the inner side of the curvature of the guide 162, namely, on the upper side thereof and using the two guide plate portions 174 on the outer side of the curvature of the guide 162, namely, on the lower side thereof. As a result, movement of the rod 152 and the curved arm 154 that are connected to the supporting shaft 161 that supports the slide roller 186 can be guided. Moreover, as a result of the two facing slide members 188 being guided by the wall plate portions 173 located on both sides in the vehicle transverse direction, the guide 162 restricts movement in the vehicle transverse direction of the supporting arm 161 and the rod 152 and curved arm 154 that are connected to the supporting arm 161.

In addition, as has been described above, when the rod 152 is moved as a result of the rack 144 being made to slide rectilinearly by the drive of the electric motor 140 in the drive mechanism portion 138, the curved arm 154 is turned via the link shaft 153, and the tailgate 115 is opened and closed. At this time, the slider 160 that is supported on the curved arm 154 side of the rod 152 is guided by the guide 162 and moves in conformity with the configuration of the guide 162. As a result of the guide 162 guiding the slider 160 in this way, when the tailgate 15 is being opened or closed, the load that is input into the rod 152 from the drive mechanism portion 138 and the load that is input into the rod 152 via the curved arm 154 can be received by the guide 162 via the slider 160. Moreover, in particular, in the initial stages of an opening action from a completely closed state of the tailgate 115, the guide 162 guides the slider 160 along a gentle movement trajectory using the rectilinear front guide portion 164 of the guide 162. Thereafter, in the stages in which the tailgate 115 is urged in the opening direction by the outer stay 118, the slider 160 is guided so as to move in a curved movement trajectory by the rear guide portion 165.

According to the power tailgate apparatus 111 of the present embodiment, which has been described above, because the rack 144 that moves rectilinearly without swinging up and down is used, the inner cover 136 and the roof lining 137, which cover the rack 144 on the vehicle interior side, can be placed in high positions, and it is possible to secure head clearance above the head of a passenger.

In addition, because the curved arm 154 is connected to the rack 144 via the rod 152, the electric motor 140 and gear box 141 including the pinion gear portion 149 can be provided separately on the front side of the aperture of the tailgate 115, and it is possible to improve the space utilization in the area around the aperture of the tailgate 115.

Figure 17:
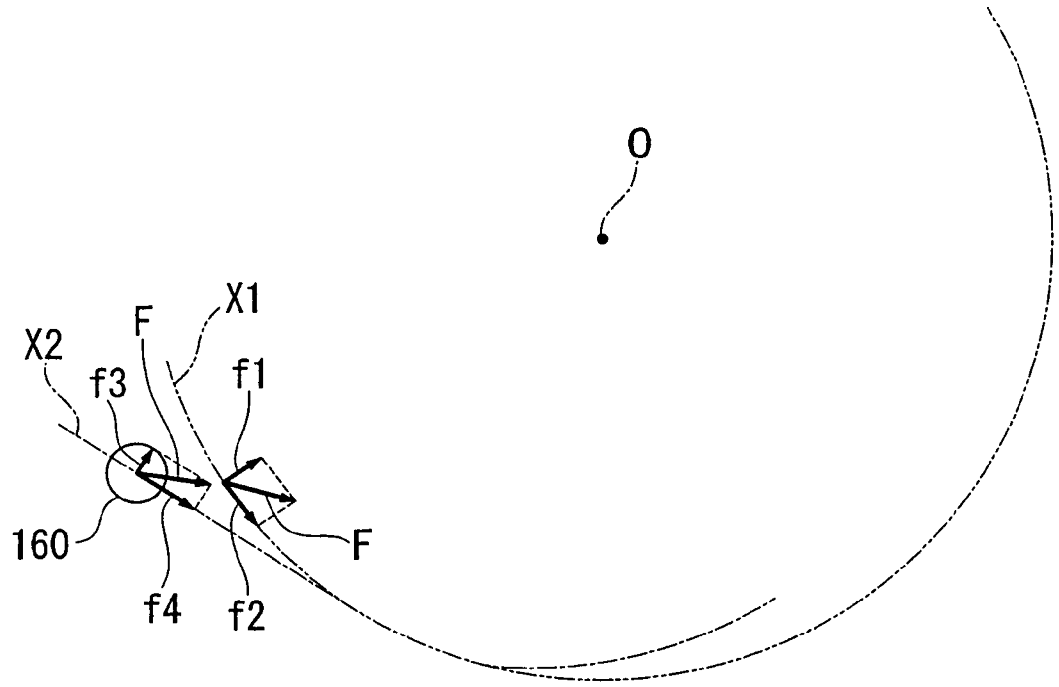
FIG. 17 is a conceptual view comparing the force generated in a slider in both the same power tailgate apparatus and a conventional power tailgate apparatus.

Furthermore, because the slider 160 is provided in the rod 152 so as to be offset further to the front than the link shaft 153, and because the guide 162 guides the slider 160 in the initial stages of an opening action of the tailgate 115, or, in other words, in the final stages of a closing action of the tailgate 115, such that the slider 160 moves along a movement trajectory that is gentler than the movement trajectory of the link shaft 155 on the tailgate 115 side, the slider 160 can be moved more smoothly compared with when the guiding is along a movement trajectory obtained by lengthening the movement trajectory of the link shaft 155. Namely, in a case in which it is supposed that the guide 162 moves the slider 160 along a movement trajectory X1, which is shown by the double dot chain line in FIG. 17, that is centered on the center of oscillation O of the hinge 17, this movement trajectory X1 being obtained by lengthening the movement trajectory of the link shaft 155, in an initial stage of an opening operation of the tailgate 115, there is a large component force f1, which acts in an upward direction, of a force F which acts in a rearward direction, that is input into the slider 160 from the rod 152, while there is a small component force f2 in the movement direction of the slider 160. Moreover, the large component force f1 moves in a direction that intersects the movement direction of the slider 160 so that a considerable slide resistance is generated. In contrast, in the present embodiment, because the slider 160 is guided so as to move along the rectilinear movement trajectory X2, which is shown by the single dot chain line in FIG. 17, that is gentler than the movement trajectory X1, in an initial stage of an opening operation of the tailgate 115, there is a small (i.e., f3<f1) component force f3, which acts in an upward direction, of a force F, which acts in a rearward direction, that is input into the slider 160 from the rod 152, so that slide resistance is suppressed. In addition, a component force f4 in the direction of movement of the slider 160 can be increased (i.e., f4>f2). Moreover, in the final stages of a closing action (i.e., in the vicinity of where the door is completely shut) where the sealing reaction force is considerable and substantial force is required, a closing action can be smoothly guided.

Accordingly, it is possible to improve the energy utilization efficiency of the movement of the slider 160, namely, of the opening and closing actions of the tail gate 115, in the initial stage of an opening action or in the final stage of a closing action (i.e., in the vicinity of where the door is completely shut) of the tailgate 115, which require a particularly large amount of energy.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A power tailgate apparatus comprising:

a curved arm of which one end side is connected to a tailgate via a link shaft;

a rod of which one end side is connected to another end side of the curved arm;

a rectilinearly moving rack connected to another end side of the rod;

a driving power source arranged at a position adjacent to the rectilinearly moving rack;

a driving force transfer part which transfers a driving power of the driving power source to the rectilinearly moving rack;

a slider provided on the rod; and a guide which guides movement of the slider along a movement trajectory whose radius of curvature is greater than a radius of curvature of a movement trajectory of the link shaft in an initial stage of an opening action of the tailgate.

* * * * *